US009940778B2

(12) United States Patent
Chun

(10) Patent No.: US 9,940,778 B2
(45) Date of Patent: *Apr. 10, 2018

(54) SYSTEM FOR MONITORING AND PLAYING A PLURALITY OF LIVE CASINO TABLE GAMES

(71) Applicant: IGT, Las Vegas, NV (US)

(72) Inventor: Jay Chun, Hong Kong (CN)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,226

(22) Filed: Nov. 26, 2012

(65) Prior Publication Data

US 2013/0190075 A1 Jul. 25, 2013

Related U.S. Application Data

(63) Continuation-in-part of application No. 13/042,633, filed on Mar. 8, 2011, which is a continuation of (Continued)

(51) Int. Cl.
*A63F 13/00* (2014.01)
*G07F 17/32* (2006.01)
(Continued)

(52) U.S. Cl.
CPC ............ *G07F 17/3225* (2013.01); *A63F 1/00* (2013.01); *A63F 3/00157* (2013.01); (Continued)

(58) Field of Classification Search
CPC .................. A63F 1/00; A63F 2001/001; A63F 2001/008; A63F 3/00157; G07F 17/32; G07F 17/3288
(Continued)

(56) References Cited

U.S. PATENT DOCUMENTS 3,708,219 A 1/1973 Forlini et al.
3,810,627 A 5/1974 Levy
(Continued)

FOREIGN PATENT DOCUMENTS

CA 2377577 6/2000
EP 0478412 4/1992
(Continued)

OTHER PUBLICATIONS

International Search Report for PCT/CA2006/002069, dated Mar. 20, 2007, 16 pgs.
(Continued)

*Primary Examiner* — William H McCulloch, Jr.
(74) *Attorney, Agent, or Firm* — Neal, Gerber & Eisenberg LLP

(57) ABSTRACT

A system for monitoring and playing a plurality of live casino table games, comprising: a plurality of dealer game tables; a plurality of electronic handheld devices remotely located from the game tables configured to display a video of at least one game taking place at the plurality of game tables; a gaming server; and a network operatively coupling the gaming server to the game tables and the electronic handheld devices; wherein each electronic handheld device includes a display part comprising: a player wagering display area having a touch screen input configured to display a plurality of touch screen results bars that allow a player to switch between the plurality of the game table's videos in response to touching the touch screen results bar to provide a selected touch screen results bar; a video display area configured to display a video of at least one game taking place at the plurality of game tables, wherein the video being displayed corresponds to the selected touch screen results bar.

12 Claims, 9 Drawing Sheets

Related U.S. Application Data application No. 11/497,708, filed on Aug. 1, 2006, now Pat. No. 7,922,587, which is a continuation-in-part of application No. 11/042,732, filed on Jan. 24, 2005, now Pat. No. 7,918,723, and a continuation-in-part of application No. 11/198,218, filed on Aug. 5, 2005, and a continuation-in-part of application No. 11/312,150, filed on Dec. 19, 2005, now Pat. No. 7,914,368.

(51) Int. Cl.
*A63F 1/00* (2006.01)
*A63F 3/00* (2006.01)

(52) U.S. Cl.
CPC ........ *G07F 17/322* (2013.01); *G07F 17/3223* (2013.01); *G07F 17/3288* (2013.01); *A63F 2001/001* (2013.01); *A63F 2001/008* (2013.01)

(58) Field of Classification Search
USPC ........ 463/10–13, 26–28, 42; 273/149 R, 292
See application file for complete search history.

(56) References Cited

U.S. PATENT DOCUMENTS 3,909,002 A 9/1975 Levy
3,998,309 A 12/1976 Mandas et al.
4,095,795 A 6/1978 Saxton
4,333,715 A 6/1982 Brooks
4,337,945 A 7/1982 Levy
4,339,798 A 7/1982 Hedges
4,448,419 A 5/1984 Telnaes
4,467,424 A 8/1984 Hedges
4,517,558 A 5/1985 Davids
4,607,844 A 8/1986 Fullerton
4,621,814 A 11/1986 Stepan et al.
4,659,082 A 4/1987 Greenberg
4,659,182 A 4/1987 Aizawa
4,662,635 A 5/1987 Enokian
4,718,672 A 1/1988 Okada
4,805,907 A 2/1989 Hagiwara
4,856,787 A 8/1989 Itkis
4,858,932 A 8/1989 Keane
4,861,041 A 8/1989 Jones
4,911,449 A 3/1990 Dickinson et al.
4,912,548 A 3/1990 Shanker et al.
4,926,327 A 5/1990 Sidley
4,998,737 A 3/1991 Lamle
5,033,744 A 7/1991 Bridgeman
5,042,818 A 8/1991 Weingardt
5,048,833 A 9/1991 Lamle
5,084,833 A 1/1992 Matsuda et al.
5,086,354 A 2/1992 Bass et al.
5,113,272 A 5/1992 Reamey
5,132,839 A 7/1992 Travis
5,248,142 A 9/1993 Breeding
5,265,882 A 11/1993 Malek
5,288,081 A 2/1994 Breeding
5,319,491 A 6/1994 Selbrede
5,325,830 A 7/1994 Hammer
5,342,047 A 8/1994 Heidel et al.
5,362,064 A 11/1994 Lofink
5,364,100 A 11/1994 Ludlow et al.
5,376,587 A 12/1994 Buchmann et al.
5,393,061 A 2/1995 Manship et al.
5,393,067 A 2/1995 Paulsen
5,395,119 A 3/1995 Jacob
5,395,120 A 3/1995 Malek
5,397,133 A 3/1995 Penzias
5,413,351 A 5/1995 Franklin
5,456,465 A 10/1995 Durham
5,467,893 A 11/1995 Landis et al.
5,472,194 A 12/1995 Breeding et al.
5,476,259 A 12/1995 Weingardt
5,490,670 A 2/1996 Hobert
5,494,296 A 2/1996 Grassa
5,539,547 A 7/1996 Ishii et al.
5,544,892 A 8/1996 Breeding
5,564,700 A 10/1996 Celona
5,580,055 A 12/1996 Hagiwara
5,580,310 A 12/1996 Orus et al.
5,585,821 A 12/1996 Ishikura et al.
5,586,937 A 12/1996 Menashe
5,588,650 A 12/1996 Eman et al.
5,589,980 A 12/1996 Bass et al.
5,605,334 A 2/1997 McCrea, Jr.
5,611,730 A 3/1997 Weiss
5,613,909 A 3/1997 Stelovsky
5,618,232 A 4/1997 Martin
5,639,092 A 6/1997 MacAisa
5,642,698 A 7/1997 Diehl et al.
5,643,086 A 7/1997 Alcorn et al.
5,655,961 A 8/1997 Acres et al.
5,664,998 A 9/1997 Seelig
5,668,174 A 9/1997 Kawagishi
5,669,606 A 9/1997 Brown
5,673,917 A 10/1997 Vancura
5,707,287 A 1/1998 McCrea, Jr.
5,722,890 A 3/1998 Libby et al.
5,735,525 A 4/1998 McCrea, Jr.
5,743,523 A 4/1998 Kelly et al.
5,743,798 A 4/1998 Adams et al.
5,745,197 A 4/1998 Leung et al.
5,752,881 A 5/1998 Inoue
5,752,882 A 5/1998 Acres et al.
5,759,103 A 6/1998 Freels et al.
5,762,552 A * 6/1998 Vuong et al. .................. 463/25
5,764,317 A 6/1998 Sadovnik et al.
5,766,076 A 6/1998 Pease et al.
5,770,533 A 6/1998 Franchi
5,772,509 A 6/1998 Weiss
RE35,864 E 7/1998 Weingardt
5,775,993 A 7/1998 Fentz
5,779,546 A 7/1998 Meissner
5,782,692 A 7/1998 Stelovsky
5,788,574 A 8/1998 Ornstein
5,791,992 A 8/1998 Crump et al.
5,795,225 A 8/1998 Jones
5,797,795 A 8/1998 Takemoto et al.
5,800,268 A 9/1998 Molnick
5,803,451 A 9/1998 Kelly et al.
5,806,854 A 9/1998 Coleman
5,820,459 A 10/1998 Acres et al.
5,820,461 A 10/1998 Pernatozzi
5,830,067 A 11/1998 Graves
5,836,817 A 11/1998 Acres et al.
5,836,818 A 11/1998 Jones
5,839,730 A 11/1998 Pike
5,839,731 A 11/1998 Feola
5,842,698 A 12/1998 Brown
5,851,149 A 12/1998 Xidos et al.
5,873,781 A 2/1999 Keane
5,876,283 A 3/1999 Parra
5,879,006 A 3/1999 Bowling
5,879,235 A 3/1999 Kaneko
5,885,085 A 3/1999 Fujita
5,888,136 A 3/1999 Herbert
5,909,876 A 6/1999 Brown
5,910,046 A 6/1999 Wada et al.
5,911,626 A 6/1999 McCrea, Jr.
5,921,865 A 7/1999 Scagnelli
5,931,471 A 8/1999 Bonito
5,951,397 A 9/1999 Dickinson
5,956,180 A 9/1999 Bass et al.
5,957,459 A 9/1999 Chae
5,961,119 A 10/1999 Brown
5,967,893 A 10/1999 Lawrence et al.
6,001,016 A 12/1999 Walker
6,015,346 A 1/2000 Bennett
6,019,374 A 2/2000 Breeding
6,027,115 A 2/2000 Griswold et al.
6,039,650 A 3/2000 Hill
6,050,895 A 4/2000 Luciano et al.

(56) References Cited

U.S. PATENT DOCUMENTS

| | | | |
|---|---|---|---|
| 6,054,969 | A | 4/2000 | Haisma |
| 6,056,641 | A | 5/2000 | Webb |
| 6,059,658 | A | 5/2000 | Mangano et al. |
| 6,080,063 | A | 6/2000 | Khosla |
| 6,083,105 | A | 7/2000 | Ronin et al. |
| 6,093,103 | A | 7/2000 | McCrea, Jr. |
| 6,113,493 | A | 9/2000 | Walker et al. |
| 6,117,012 | A | 9/2000 | McCrea, Jr. |
| 6,135,884 | A | 10/2000 | Hedrick et al. |
| 6,142,876 | A | 11/2000 | Cumbers |
| 6,146,270 | A | 11/2000 | Huard |
| 6,149,522 | A | 11/2000 | Alcorn et al. |
| 6,159,095 | A | 12/2000 | Frohm |
| 6,159,098 | A | 12/2000 | Slomiany et al. |
| 6,165,069 | A | 12/2000 | Sines et al. |
| 6,213,875 | B1 | 4/2001 | Suzuki |
| 6,217,447 | B1 * | 4/2001 | Lofink et al. .................. 463/12 |
| 6,234,482 | B1 | 5/2001 | Henderson |
| 6,241,608 | B1 | 6/2001 | Torango |
| 6,244,596 | B1 | 6/2001 | Kondratjuk |
| 6,251,014 | B1 | 6/2001 | Stockdale et al. |
| 6,252,707 | B1 | 6/2001 | Kleinberger et al. |
| 6,254,481 | B1 | 7/2001 | Jaffe |
| 6,254,484 | B1 | 7/2001 | McCrea, Jr. |
| 6,264,561 | B1 | 7/2001 | Saffari |
| 6,279,910 | B1 | 8/2001 | De |
| 6,293,864 | B1 | 9/2001 | Romero |
| 6,312,334 | B1 | 11/2001 | Yoseloff |
| 6,315,666 | B1 | 11/2001 | Mastera et al. |
| 6,336,857 | B1 | 1/2002 | McBride |
| 6,337,513 | B1 | 1/2002 | Clevenger et al. |
| 6,345,824 | B1 | 2/2002 | Selitzky |
| 6,346,044 | B1 | 2/2002 | McCrea, Jr. |
| 6,347,996 | B1 | 2/2002 | Gilmore et al. |
| 6,361,437 | B1 | 3/2002 | Walker |
| 6,368,216 | B1 | 4/2002 | Hedrick et al. |
| 6,375,567 | B1 | 4/2002 | Acres |
| 6,375,576 | B1 | 4/2002 | Margerie |
| 6,379,244 | B1 | 4/2002 | Sagawa et al. |
| 6,394,907 | B1 | 5/2002 | Rowe |
| 6,398,220 | B1 | 6/2002 | Inoue |
| 6,409,602 | B1 | 6/2002 | Wiltshire |
| 6,416,827 | B1 | 7/2002 | Chakrapani et al. |
| 6,435,970 | B1 | 8/2002 | Baerlocher et al. |
| 6,444,496 | B1 | 9/2002 | Edwards et al. |
| 6,445,185 | B1 | 9/2002 | Damadian et al. |
| 6,460,848 | B1 | 10/2002 | Soltys |
| 6,491,583 | B1 | 12/2002 | Gauselmann |
| 6,503,147 | B1 | 1/2003 | Stockdale et al. |
| 6,508,709 | B1 | 1/2003 | Karmarkar |
| 6,511,072 | B1 | 1/2003 | Santa |
| 6,511,375 | B1 | 1/2003 | Kaminkow |
| 6,512,559 | B1 | 1/2003 | Hashimoto et al. |
| 6,514,141 | B1 | 2/2003 | Kaminkow et al. |
| 6,517,073 | B1 | 2/2003 | Vancura |
| 6,517,433 | B2 | 2/2003 | Loose et al. |
| 6,517,436 | B2 | 2/2003 | Soltys |
| 6,517,437 | B1 | 2/2003 | Wells et al. |
| 6,540,230 | B1 | 4/2003 | Walker |
| 6,547,664 | B2 | 4/2003 | Saunders |
| 6,569,018 | B2 | 5/2003 | Jaffe |
| 6,575,541 | B1 | 6/2003 | Hedrick et al. |
| 6,575,834 | B1 | 6/2003 | Lindo |
| 6,582,301 | B2 | 6/2003 | Hill |
| 6,582,302 | B2 | 6/2003 | Romero |
| 6,585,591 | B1 | 7/2003 | Baerlocher et al. |
| 6,588,758 | B1 | 7/2003 | Lee |
| 6,607,195 | B2 | 8/2003 | Vancura |
| 6,609,978 | B1 | 8/2003 | Paulsen |
| 6,626,757 | B2 | 9/2003 | Oliveras |
| 6,628,244 | B1 | 9/2003 | Hirosawa |
| D480,961 | S | 10/2003 | Deadman |
| 6,646,695 | B1 | 11/2003 | Gauselmann |
| 6,652,378 | B2 | 11/2003 | Cannon et al. |
| 6,656,048 | B2 | 12/2003 | Olsen |
| 6,659,864 | B2 | 12/2003 | McGahn et al. |
| 6,659,866 | B2 | 12/2003 | Frost |
| 6,661,425 | B1 | 12/2003 | Hiroaki |
| 6,676,517 | B2 | 1/2004 | Beavers |
| 6,685,567 | B2 | 2/2004 | Cockerille et al. |
| 6,695,703 | B1 | 2/2004 | McGahn |
| 6,702,675 | B2 | 3/2004 | Poole et al. |
| 6,712,694 | B1 | 3/2004 | Nordman |
| 6,712,696 | B2 | 3/2004 | Soltys |
| 6,715,756 | B2 | 4/2004 | Inoue |
| 6,717,728 | B2 | 4/2004 | Putilin |
| 6,719,291 | B1 | 4/2004 | Dekeller |
| 6,722,979 | B2 | 4/2004 | Gilmore et al. |
| 6,726,564 | B2 | 4/2004 | Hogan |
| 6,726,565 | B2 | 4/2004 | Hughs-Baird |
| 6,755,741 | B1 | 6/2004 | Rafaeli |
| 6,789,801 | B2 | 9/2004 | Snow |
| 6,800,026 | B2 | 10/2004 | Cannon |
| 6,802,777 | B2 | 10/2004 | Seelig et al. |
| 6,804,763 | B1 | 10/2004 | Stockdale et al. |
| 6,805,628 | B2 | 10/2004 | Romero |
| 6,808,173 | B2 | 10/2004 | Snow |
| 6,817,945 | B2 | 11/2004 | Seelig et al. |
| 6,817,946 | B2 | 11/2004 | Motegi et al. |
| 6,837,494 | B2 | 1/2005 | Lee |
| 6,863,608 | B1 | 3/2005 | LeMay et al. |
| 6,866,586 | B2 | 3/2005 | Oberberger et al. |
| 6,887,157 | B2 | 5/2005 | LeMay et al. |
| 6,890,259 | B2 | 5/2005 | Breckner et al. |
| 6,896,614 | B2 | 5/2005 | Romero |
| 6,899,625 | B2 | 5/2005 | Luciano |
| 6,906,762 | B1 | 6/2005 | Witehira et al. |
| 6,916,245 | B1 | 7/2005 | Vancura |
| 6,937,298 | B2 | 8/2005 | Okada |
| 7,008,319 | B2 | 3/2006 | Montgomery |
| 7,029,395 | B1 | 4/2006 | Baerlocher |
| 7,070,505 | B2 | 7/2006 | Vancura |
| 7,114,724 | B2 | 10/2006 | Ritzer |
| 7,128,647 | B2 | 10/2006 | Muir |
| 7,189,161 | B1 | 3/2007 | Wiltshire |
| 7,198,272 | B2 | 4/2007 | Duhamel |
| 7,204,753 | B2 | 4/2007 | Ozaki et al. |
| 7,213,812 | B2 | 5/2007 | Schubert |
| 7,220,181 | B2 | 5/2007 | Okada |
| 7,226,040 | B2 | 6/2007 | Keister |
| 7,252,288 | B2 | 8/2007 | Seelig et al. |
| 7,255,643 | B2 | 8/2007 | Ozaki et al. |
| 7,264,241 | B2 | 9/2007 | Schubert |
| 7,285,048 | B2 * | 10/2007 | Karmarkar ............. G07F 17/32 463/42 |
| 7,303,473 | B2 | 12/2007 | Rowe |
| 7,303,475 | B2 | 12/2007 | Britt |
| 7,309,065 | B2 | 12/2007 | Yoseloff |
| 7,309,284 | B2 | 12/2007 | Griswold et al. |
| 7,311,604 | B2 | 12/2007 | Kaminkow |
| 7,316,398 | B1 | 1/2008 | Pham |
| 7,316,615 | B2 | 1/2008 | Soltys |
| 7,322,884 | B2 | 1/2008 | Emori et al. |
| 7,325,806 | B1 | 2/2008 | Feola |
| 7,326,115 | B2 | 2/2008 | Baerlocher |
| 7,329,179 | B2 | 2/2008 | Baerlocher |
| 7,329,181 | B2 | 2/2008 | Hoshino et al. |
| 7,351,146 | B2 | 4/2008 | Kaminkow |
| 7,361,090 | B2 | 4/2008 | Lin |
| 7,367,884 | B2 | 5/2008 | Breeding |
| 7,387,570 | B2 | 6/2008 | Randall |
| 7,404,765 | B2 | 7/2008 | Soltys |
| 7,407,438 | B2 | 8/2008 | Schubert |
| 7,419,160 | B1 | 9/2008 | D'Ambrosio |
| 7,434,805 | B2 | 10/2008 | Grauzer |
| 7,451,987 | B1 | 11/2008 | Feola |
| 7,452,270 | B2 | 11/2008 | Walker et al. |
| 7,465,227 | B2 | 12/2008 | Baerlocher |
| 7,470,185 | B2 | 12/2008 | Baerlocher |
| 7,488,251 | B2 | 2/2009 | Kaminkow |
| 7,503,849 | B2 | 3/2009 | Hornik et al. |
| 7,537,456 | B2 | 5/2009 | Snow |
| 7,566,274 | B2 | 7/2009 | Johnson et al. |
| 7,572,183 | B2 | 8/2009 | Olivas |

(56) References Cited

U.S. PATENT DOCUMENTS 7,575,512 B2 8/2009 Kennedy
7,584,967 B2 9/2009 Webb
7,591,726 B2 9/2009 Baerlocher et al.
7,591,728 B2 9/2009 Gioia
7,614,948 B2 11/2009 Saffari
7,618,319 B2 11/2009 Casey et al.
7,621,533 B2 11/2009 Kenny
7,666,086 B2 2/2010 Baerlocher
7,666,087 B2 2/2010 Hughs-Baird
7,699,698 B2 4/2010 Randall
7,731,586 B2 6/2010 Letovsky
7,735,657 B2 6/2010 Johnson
7,753,798 B2 7/2010 Soltys
7,758,419 B2 7/2010 Rowe et al.
7,762,889 B2 7/2010 Shigeta
7,769,232 B2 8/2010 Downs
7,775,524 B2 8/2010 Lutnick et al.
7,775,868 B2 8/2010 Toyoda
7,780,515 B2 8/2010 Okada
7,789,743 B2 9/2010 Walker et al.
7,819,744 B2 10/2010 Hughs-Baird
7,822,641 B2 10/2010 Abbott et al.
7,828,643 B2 11/2010 Baerlocher
7,837,547 B2 11/2010 Cannon
7,846,018 B2 12/2010 Baerlocher
7,867,077 B2 1/2011 Baerlocher et al.
7,878,892 B2 2/2011 Sines et al.
7,905,771 B2 3/2011 Walker et al.
7,905,774 B2 3/2011 Walker et al.
7,909,688 B2 3/2011 Yoshizawa
7,914,368 B2 * 3/2011 Chun .............................. 463/12
7,914,372 B2 3/2011 Tessmer et al.
7,918,723 B2 * 4/2011 Chun .............................. 463/12
7,922,587 B2 * 4/2011 Chun .............................. 463/42
7,931,531 B2 4/2011 Oberberger
7,950,993 B2 5/2011 Oberberger
7,963,845 B2 6/2011 Baerlocher
7,967,674 B2 6/2011 Baerlocher
7,976,378 B2 7/2011 Baerlocher
7,980,948 B2 7/2011 Rowe et al.
8,002,281 B2 8/2011 Kearns
8,020,866 B2 9/2011 Walker et al.
8,066,564 B2 11/2011 Randall
8,087,984 B2 1/2012 Okujyo
8,087,985 B2 1/2012 Katz
8,087,999 B2 1/2012 Oberberger et al.
8,109,821 B2 2/2012 Kovacs
8,123,618 B2 2/2012 Karmarkar
8,128,491 B2 3/2012 Vasquez et al.
8,128,492 B2 3/2012 Vasquez et al.
8,152,617 B2 4/2012 Katz
8,152,624 B2 4/2012 Gerrard et al.
8,152,629 B2 4/2012 DeWaal et al.
8,167,711 B2 5/2012 Baerlocher
8,172,660 B2 5/2012 Lancaster et al.
8,177,627 B2 5/2012 Baerlocher
8,182,321 B2 5/2012 Chun
8,182,323 B2 5/2012 Okada
8,197,335 B2 6/2012 DeWaal et al.
8,202,153 B2 6/2012 Baerlocher
8,206,212 B2 6/2012 Iddings et al.
8,210,920 B2 7/2012 Chun
8,231,456 B2 7/2012 Zielinski
8,235,801 B2 8/2012 Tan
8,267,765 B2 9/2012 Baerlocher
8,305,550 B2 11/2012 Jung et al.
8,308,559 B2 11/2012 Chun
8,313,373 B2 11/2012 Walker et al.
8,317,589 B2 11/2012 Tessmer et al.
8,323,105 B2 12/2012 Chun
8,342,954 B2 1/2013 Oberberger et al.
8,360,852 B2 1/2013 Randall
8,360,859 B2 1/2013 Walker et al.
8,403,740 B2 3/2013 Kovacs et al.
8,425,305 B2 4/2013 Baerlocher et al.
8,430,735 B2 4/2013 Oberberger
8,430,739 B2 4/2013 Rodgers
8,454,427 B2 6/2013 Baerlocher
8,460,095 B2 6/2013 Tan
8,474,820 B2 7/2013 Walker et al.
8,485,888 B2 7/2013 Baerlocher
8,496,521 B2 7/2013 Randall
8,500,533 B2 8/2013 Lutnick et al.
8,506,380 B2 8/2013 Hughes et al.
8,517,824 B2 8/2013 Zielinski et al.
8,613,650 B2 12/2013 Kovacs et al.
8,668,564 B2 * 3/2014 Chun .................. G07F 17/3258
273/149 R
8,956,210 B2 * 2/2015 Chun .................. G07F 17/3244
273/149 R
9,058,716 B2 * 6/2015 Rajaraman .......... G07F 17/3206
9,135,775 B2 9/2015 Pececnik
9,214,056 B2 12/2015 Kovacs et al.
9,230,398 B2 * 1/2016 Chun .................. G07F 17/3225
9,240,095 B2 * 1/2016 Chun ...................... G07F 17/32
9,311,773 B2 * 4/2016 Chun .................. G07F 17/3293
9,704,348 B2 * 7/2017 Chun .................. G07F 17/3293
2001/0000118 A1 4/2001 Sines
2001/0013681 A1 8/2001 Bruzzese et al.
2001/0029200 A1 10/2001 Romero
2002/0002070 A1 1/2002 Romero
2002/0002073 A1 1/2002 Montgomery
2002/0015489 A1 2/2002 Ben-David
2002/0036380 A1 3/2002 Perrie
2002/0045472 A1 4/2002 Adams
2002/0068635 A1 6/2002 Hill
2002/0072407 A1 6/2002 Soltys
2002/0077170 A1 6/2002 Johnson
2002/0077712 A1 6/2002 Safaei et al.
2002/0090988 A1 7/2002 Frost
2002/0094869 A1 7/2002 Harkham
2002/0111205 A1 8/2002 Beavers
2002/0115489 A1 8/2002 Jordan
2002/0147042 A1 10/2002 Vuong
2002/0147047 A1 10/2002 Letovsky
2002/0173354 A1 11/2002 Winans et al.
2003/0003997 A1 * 1/2003 Vuong et al. ................... 463/42
2003/0013510 A1 1/2003 Vuong
2003/0027624 A1 2/2003 Gilmore et al.
2003/0032478 A1 2/2003 Takahama et al.
2003/0032479 A1 2/2003 LeMay et al.
2003/0050107 A1 3/2003 Moody
2003/0060271 A1 3/2003 Gilmore et al.
2003/0064781 A1 4/2003 Muir
2003/0067112 A1 4/2003 Grauzer
2003/0069071 A1 4/2003 Britt
2003/0073497 A1 4/2003 Nelson
2003/0087690 A1 5/2003 Loose et al.
2003/0104854 A1 6/2003 Cannon
2003/0109306 A1 6/2003 Karmarkar
2003/0130028 A1 7/2003 Aida et al.
2003/0151199 A1 8/2003 Lee
2003/0151201 A1 8/2003 Lee
2003/0176214 A1 9/2003 Burak et al.
2003/0181231 A1 9/2003 Vancura
2003/0203756 A1 10/2003 Jackson
2003/0216169 A1 * 11/2003 Walker ................... G06Q 30/02
463/25
2003/0224854 A1 12/2003 Joao
2003/0232651 A1 12/2003 Huard
2003/0234489 A1 12/2003 Okada
2003/0236113 A1 12/2003 Webb
2003/0236114 A1 12/2003 Griswold et al.
2003/0236118 A1 12/2003 Okada
2004/0002379 A1 1/2004 Parrott et al.
2004/0023712 A1 2/2004 Oliver
2004/0023714 A1 2/2004 Asdale
2004/0023722 A1 2/2004 Vuong
2004/0029636 A1 2/2004 Wells
2004/0063490 A1 4/2004 Okada
2004/0066475 A1 4/2004 Searle
2004/0070146 A1 4/2004 Snow
2004/0077425 A1 4/2004 Goossens
2004/0082372 A1 4/2004 Romero

(56) References Cited

U.S. PATENT DOCUMENTS

2004/0084843 A1 5/2004 Snow
2004/0087357 A1 5/2004 Johnson
2004/0090003 A1 5/2004 Snow
2004/0090005 A1 5/2004 Snow
2004/0108656 A1 6/2004 Snow
2004/0116177 A1 6/2004 Frost
2004/0116178 A1 6/2004 Okada
2004/0116179 A1 6/2004 Nicely
2004/0145116 A1 7/2004 Calvo et al.
2004/0147303 A1 7/2004 Imura et al.
2004/0147314 A1 7/2004 LeMay et al.
2004/0150162 A1 8/2004 Okada
2004/0162146 A1 8/2004 Ooto
2004/0166925 A1 8/2004 Emori et al.
2004/0166941 A1 8/2004 Fujimoto
2004/0171423 A1 9/2004 Silva et al.
2004/0183972 A1 9/2004 Bell
2004/0185933 A1 9/2004 Nicely
2004/0192430 A1 9/2004 Burak et al.
2004/0198485 A1 10/2004 Loose et al.
2004/0207154 A1 10/2004 Okada
2004/0209666 A1 10/2004 Tashiro
2004/0209667 A1 10/2004 Emori et al.
2004/0209668 A1 10/2004 Okada
2004/0209671 A1 10/2004 Okada
2004/0209678 A1 10/2004 Okada
2004/0209683 A1 10/2004 Okada
2004/0214635 A1 10/2004 Okada
2004/0214637 A1 10/2004 Nonaka
2004/0224747 A1 11/2004 Okada
2004/0224777 A1 11/2004 Smith
2004/0233663 A1 11/2004 Emslie et al.
2004/0235542 A1 11/2004 Stronach
2004/0239582 A1 12/2004 Seymour
2005/0003886 A1 1/2005 Englman
2005/0032571 A1 2/2005 Asonuma
2005/0037843 A1 2/2005 Wells et al.
2005/0043079 A1* 2/2005 Huang .................... G07F 17/32 463/19
2005/0049032 A1 3/2005 Kobayashi
2005/0049046 A1 3/2005 Kobayashi
2005/0062227 A1 3/2005 Grauzer
2005/0062410 A1 3/2005 Bell et al.
2005/0063055 A1 3/2005 Engel
2005/0073102 A1 4/2005 Yoseloff
2005/0079913 A1 4/2005 Inamura
2005/0085292 A1 4/2005 Inamura
2005/0153772 A1 7/2005 Griswold et al.
2005/0153775 A1 7/2005 Griswold et al.
2005/0176493 A1 8/2005 Nozaki et al.
2005/0176507 A1 8/2005 Ephrati et al.
2005/0192090 A1 9/2005 Muir et al.
2005/0192099 A1 9/2005 Nguyen et al.
2005/0206582 A1 9/2005 Bell et al.
2005/0208994 A1 9/2005 Berman
2005/0218597 A1 10/2005 Parsadaian
2005/0233794 A1 10/2005 Cannon
2005/0233799 A1 10/2005 LeMay et al.
2005/0233803 A1 10/2005 Yang
2005/0239539 A1 10/2005 Inamura
2005/0266912 A1 12/2005 Sekiguchi
2005/0282618 A1 12/2005 OHalloran
2005/0282625 A1 12/2005 Nicely
2005/0285337 A1 12/2005 Durham et al.
2006/0009283 A1 1/2006 Englman
2006/0030399 A1 2/2006 Baerlocher
2006/0033267 A1 2/2006 Wong
2006/0040733 A1 2/2006 Baerlocher
2006/0052149 A1 3/2006 Bursill
2006/0052168 A1 3/2006 Shacham
2006/0063577 A1 3/2006 Downs
2006/0071429 A1 4/2006 Okujyo
2006/0073882 A1 4/2006 Rozkin et al.
2006/0092170 A1 5/2006 Bathiche et al.
2006/0100014 A1 5/2006 Griswold et al.
2006/0103071 A1 5/2006 Ritzer
2006/0103951 A1 5/2006 Bell et al.
2006/0125745 A1 6/2006 Evanicky
2006/0128472 A1 6/2006 Beavers
2006/0135240 A1 6/2006 Barshack
2006/0135243 A1 6/2006 Englman
2006/0148547 A1 7/2006 Montgomery
2006/0166726 A1* 7/2006 Chun .............................. 463/12
2006/0166727 A1 7/2006 Burak
2006/0166731 A1 7/2006 Yoshimi
2006/0178181 A1 8/2006 Chun
2006/0189382 A1 8/2006 Muir et al.
2006/0191177 A1 8/2006 Engel
2006/0226605 A1 10/2006 Kenny
2006/0258446 A1 11/2006 Nguyen et al.
2006/0284574 A1 12/2006 Emslie et al.
2006/0287042 A1 12/2006 Osawa
2006/0287058 A1 12/2006 Resnick
2006/0290594 A1 12/2006 Engel et al.
2007/0004510 A1 1/2007 Underdahl et al.
2007/0010315 A1 1/2007 Hein
2007/0013127 A1 1/2007 Ellis
2007/0018406 A1 1/2007 Kennedy
2007/0021198 A1 1/2007 Muir et al.
2007/0026922 A1 2/2007 Lindo
2007/0026947 A1 2/2007 Chun
2007/0032283 A1 2/2007 Chun
2007/0060259 A1 3/2007 Pececnik
2007/0117604 A1* 5/2007 Hill ......................... G07F 17/32 463/16
2007/0129123 A1 6/2007 Eryou et al.
2007/0135204 A1 6/2007 Nicely
2007/0155512 A1 7/2007 Wells
2007/0218968 A1 9/2007 Snow
2007/0243927 A1 10/2007 Soltys
2007/0243929 A1 10/2007 Skotarczak
2007/0243935 A1 10/2007 Huizinga
2008/0001358 A1 1/2008 Scott
2008/0009334 A1 1/2008 Walker
2008/0020816 A1 1/2008 Griswold et al.
2008/0020839 A1 1/2008 Wells et al.
2008/0020840 A1 1/2008 Wells et al.
2008/0020841 A1 1/2008 Wells et al.
2008/0026807 A1 1/2008 Moshal
2008/0045288 A1 2/2008 Moshal
2008/0064467 A1 3/2008 Reiner
2008/0076499 A1 3/2008 Lowery
2008/0085769 A1 4/2008 Lutnick
2008/0108400 A1 5/2008 Chun
2008/0113778 A1 5/2008 Chun
2008/0113783 A1 5/2008 Czyzewski
2008/0146311 A1 6/2008 Walker
2008/0146344 A1 6/2008 Rowe et al.
2008/0149705 A1 6/2008 Giobbi et al.
2008/0182650 A1 7/2008 Randall et al.
2008/0194334 A1 8/2008 Kuok
2008/0214274 A1 9/2008 Thomas
2008/0230993 A1 9/2008 Chun
2008/0231611 A1 9/2008 Bathiche et al.
2008/0248865 A1 10/2008 Tedesco et al.
2008/0254881 A1 10/2008 Lutnick
2008/0274802 A1 11/2008 Joao
2008/0280667 A1 11/2008 Chun
2008/0280668 A1 11/2008 Chun
2008/0305855 A1 12/2008 Czyzewski
2008/0318668 A1 12/2008 Ching et al.
2009/0029755 A1 1/2009 Chun
2009/0029766 A1 1/2009 Lutnick et al.
2009/0061974 A1 3/2009 Lutnick
2009/0069079 A1 3/2009 Britt
2009/0075724 A1 3/2009 Breeding
2009/0111573 A1 4/2009 Iddings
2009/0115133 A1 5/2009 Kelly
2009/0124323 A1 5/2009 Dunn
2009/0124385 A1 5/2009 Cuddy
2009/0137313 A1 5/2009 Young
2009/0176547 A1 7/2009 Katz
2009/0203433 A1 8/2009 Olivas
2009/0221360 A1 9/2009 Wooding

(56) References Cited

U.S. PATENT DOCUMENTS

| | | | | |
|---|---|---|---|---|
| 2009/0252546 | A1 | 10/2009 | Kaleta | |
| 2010/0056262 | A1 | 3/2010 | Englman | |
| 2010/0102511 | A1 | 4/2010 | Tammesoo | |
| 2010/0105457 | A1 | 4/2010 | Miller | |
| 2010/0105459 | A1 | 4/2010 | Miller | |
| 2010/0111820 | A1 | 5/2010 | Natura et al. | |
| 2010/0113119 | A1 | 5/2010 | Miller | |
| 2010/0117299 | A1 | 5/2010 | Nicely | |
| 2010/0120506 | A1 | 5/2010 | Davis et al. | |
| 2010/0130280 | A1 | 5/2010 | Arezina et al. | |
| 2010/0222133 | A1 | 9/2010 | Spencer | |
| 2010/0234086 | A1 | 9/2010 | Michaelson | |
| 2010/0255897 | A1 | 10/2010 | Pececnik | |
| 2010/0295247 | A1 | 11/2010 | LaDuca | |
| 2011/0031694 | A1 | 2/2011 | Cohen | |
| 2011/0039612 | A1 | 2/2011 | Pececnik | |
| 2011/0059800 | A1 | 3/2011 | Anderson | |
| 2011/0105207 | A1 | 5/2011 | Chun | |
| 2011/0111824 | A1 | 5/2011 | Cuddy et al. | |
| 2011/0120506 | A1 | 5/2011 | Sakai | |
| 2011/0140362 | A1 | 6/2011 | Chun | |
| 2011/0159965 | A1* | 6/2011 | Chun | 463/42 |
| 2012/0064958 | A1 | 3/2012 | Lisandro | |
| 2012/0270625 | A1 | 10/2012 | Chun | |
| 2012/0276973 | A1 | 11/2012 | Kishi | |
| 2012/0289300 | A1 | 11/2012 | Chun | |
| 2012/0309524 | A1* | 12/2012 | Rajaraman | G07F 17/3206 463/31 |
| 2013/0165201 | A1 | 6/2013 | Chun | |
| 2013/0165235 | A1* | 6/2013 | Chun | G07F 17/3262 463/42 |
| 2013/0184044 | A1 | 7/2013 | Frost | |
| 2013/0190075 | A1 | 7/2013 | Chun | |
| 2013/0288764 | A1 | 10/2013 | Chun | |
| 2013/0288779 | A1 | 10/2013 | Chun | |
| 2014/0135088 | A1 | 5/2014 | Chun | |
| 2017/0018146 | A9* | 1/2017 | Chun | G07F 17/3293 |
| 2017/0236369 | A1* | 8/2017 | Chun | G07F 17/3223 463/13 |
| 2017/0256129 | A1* | 9/2017 | Chun | G07F 17/3293 |
| 2017/0309116 | A1* | 10/2017 | Chun | G07F 17/3258 |
| 2017/0316637 | A1* | 11/2017 | Chun | G07F 17/3262 |
| 2017/0345261 | A1* | 11/2017 | Chun | G07F 17/3258 |

FOREIGN PATENT DOCUMENTS

| | | | |
|---|---|---|---|
| EP | 1101513 | A2 | 5/2001 |
| EP | 1467329 | | 10/2004 |
| EP | 1892683 | | 2/2008 |
| GB | 2408696 | | 6/2005 |
| GB | 2403429 | | 7/2006 |
| GB | 2430385 | | 3/2007 |
| JP | H0956889 | A | 3/1997 |
| JP | 2006181270 | A | 7/2006 |
| WO | WO 99/19027 | | 4/1999 |
| WO | WO 99/42889 | | 8/1999 |
| WO | WO 99/44095 | | 9/1999 |
| WO | 0079467 | | 12/2000 |
| WO | WO 01/09664 | | 2/2001 |
| WO | WO 01/15127 | | 3/2001 |
| WO | WO 01/15128 | | 3/2001 |
| WO | WO 01/15132 | | 3/2001 |
| WO | 0217841 | | 3/2002 |
| WO | WO 2004/001486 | | 12/2003 |
| WO | WO 2004/102520 | | 11/2004 |
| WO | 2005056134 | | 6/2005 |
| WO | 2005065793 | A1 | 7/2005 |
| WO | WO 2006/034192 | | 3/2006 |
| WO | WO 2006/038819 | | 4/2006 |
| WO | 2007016035 | | 2/2007 |
| WO | WO 2007/032945 | | 3/2007 |
| WO | WO 2007/073534 | | 6/2007 |
| WO | 2007099334 | | 3/2008 |
| WO | 2008026950 | | 3/2008 |
| WO | 2008092385 | | 8/2008 |
| WO | 2009107131 | | 9/2009 |
| WO | WO 2014/067389 | | 5/2014 |

OTHER PUBLICATIONS

International Search Report for PCT/CA2006/001295, dated Nov. 2, 2006, 17 pgs.

EZ Baccarat. DP Stud, Inc., www.ezbaccarat.com, 2 pgs. (2003).

"Scarne's Encyclopedia of Card Games," by John Scarne, 1973, HarperCollins, New York, N.Y., chapter on banking games.

"Scarne's Complete Guide to Gambling," by John Scarne, 1961, Simon & Schuster, New York, N.Y., chapter on roulette.

Parlett, David. "A History of Poker." Copyright 2005. Accessed Aug. 23, 2013. 13pp. <http://www.pagat.com/poker/history.html>.

"Sic bo". Wikipedia, the free encyclopedia. First accessed Feb. 12, 2013. Current version Feb. 14, 2013. <http://en.wikipedia.org/wiki/Sic_bo>.

Macau Patent Application Notice of Allowance, Macau Patent Application I/150.

Australian Examination Report No. 1 for Australian Application No. 2013347597, dated Mar. 10, 2016 (3 pages).

Australian Examination Report No. 2 for Australian Application No. 2013347597, dated Oct. 31, 2016 (2 pages).

* cited by examiner

FIG. 4A
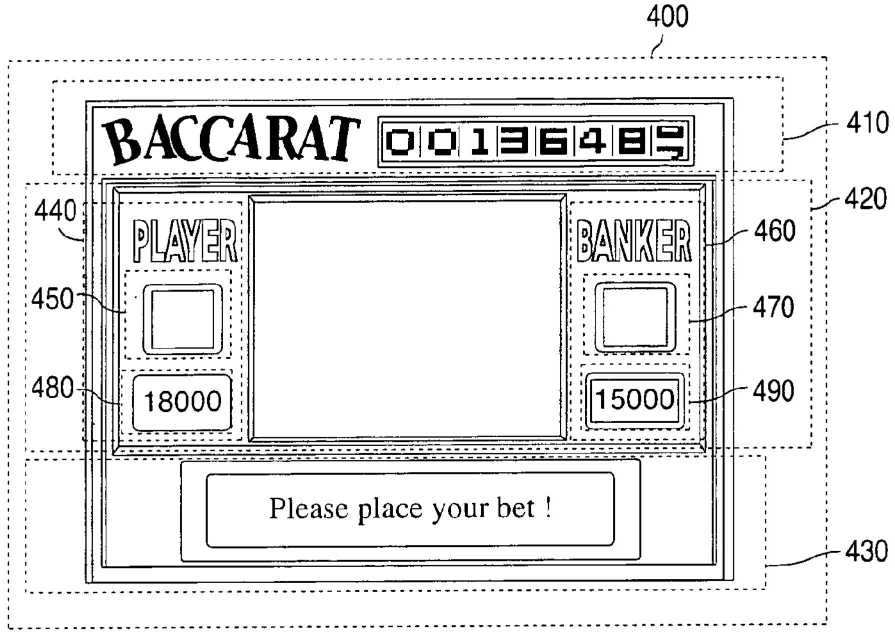
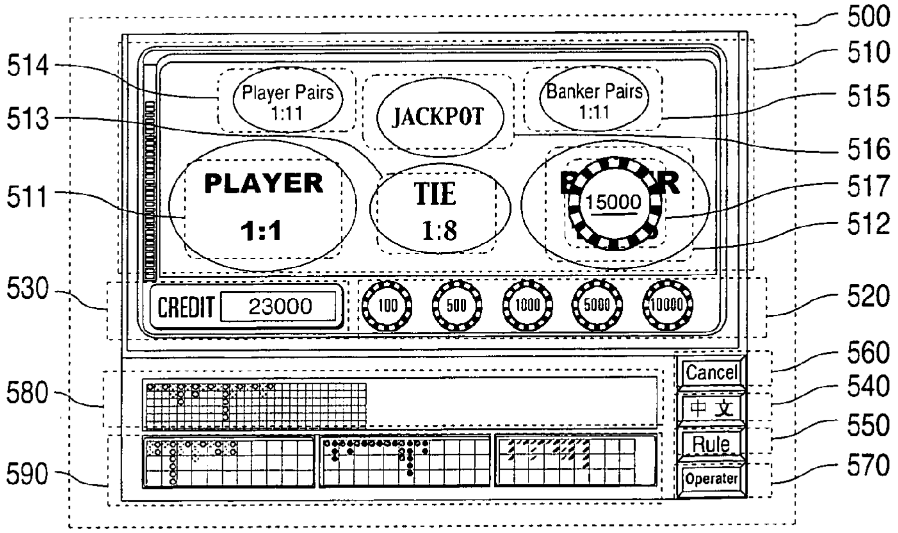
FIG. 4B

SYSTEM FOR MONITORING AND PLAYING A PLURALITY OF LIVE CASINO TABLE GAMES

CROSS-REFERENCE TO RELATED APPLICATIONS

The present application is a continuation-in-part of U.S. application Ser. No. 13/042,633 filed Mar. 8, 2011 entitled "Betting terminal and system" which is a continuing application of U.S. Ser. No. 11/497,708 filed Aug. 1, 2006, and a continuation-in-part of U.S. application Ser. No. 11/042,732, filed Jan. 24, 2005, U.S. application Ser. No. 11/198,218, filed on Aug. 5, 2005 and U.S. application Ser. No. 11/312,150, filed on Dec. 19, 2005, the entire contents of all applications which are incorporated by this reference.

BACKGROUND OF THE INVENTION

The present invention is generally directed to a betting terminal for playing a game such as a baccarat game. The invention betting terminal allows players to play different games without moving from one gaming table to another. Therefore, the invention helps to maximize the time spent by players on gaming tables while they are inside a casino and also maximize the utilization of casino floor space.

Gaming is a major form of modern entertainment. For example, baccarat is one of the more popular gambling games played in casinos or gaming establishments. As is well known, the game is played on an elongated table having a game board displayed along the upper surface of the table. The game board displays certain wagering areas, and the elongated table allows for the seating of multiple players or bettors (1-16) and the positioning of the multiple dealers (3) necessary for operating the casino game. Bettor locations are typically numbered on the table and each bettor location has an area designated for a wager on the bank hand and an area designated for a wager on the player hand. Baccarat uses a standard deck of 52 playing cards and is usually dealt from a shoe having multiple decks that have been shuffled together prior to the beginning of play: A feature of conventional live games is that the betting process is limited to a single game. The simplicity of the betting process has led to a corresponding simplicity in the relatively few types of games which may be placed during in a casino, for example, which may limit interest on the part of the player(s) and thus further limit the casino in terms of profit and payout. The embodiments described below address the above-described issues and needs.

SUMMARY OF THE INVENTION

Provided is a betting terminal for playing a game. The betting terminal comprises a network of terminals linked to different game tables where each of the terminals comprises a mechanism to switch on a plurality of games. A player at one terminal can switch to different tables and place bets at different games at a time. The games can be games of the same kind or games of different kind.

In some embodiments, a betting terminal can serve as a platform for placing bets in games like baccarat, roulette, sicbo ("dice game") as well as other common casino table games which are operated at tables linked to game and payout servers and betting terminals through an intranet. In some embodiments, the roulette and sicbo table games can be operated automatically or by human dealers, but the betting results shall be recorded automatically or manually and sent to game and payout servers electronically to allow automatic payout process.

The present invention also provides a software program or a set of software programs for carrying out any or all steps of the betting method described herein. The baccarat game can also be incorporated into an electronic device or an entertainment gaming machine. Representative electronic devices include, but are not limited to, laptop computers or desktop computers.

BRIEF DESCRIPTION OF DRAWINGS

FIGS. 4A, 4B, 4C and 4D show the detailed layout of a betting terminal for a baccarat machine.

DETAILED DESCRIPTION

Provided is a betting terminal for playing a game. The betting terminal comprises a network of terminals linked to different game tables where each of the terminals comprises a mechanism to switch on a plurality of games. A player at one terminal can switch to different tables and place bets at different games at a time. The games can be games of the same kind or games of different kind.

Figure 1:
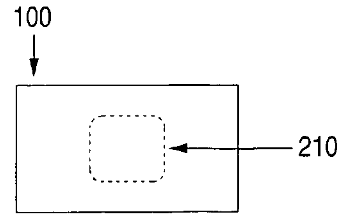
FIG. 1 shows an illustrative scheme of the betting terminal described herein.
Figure 2:
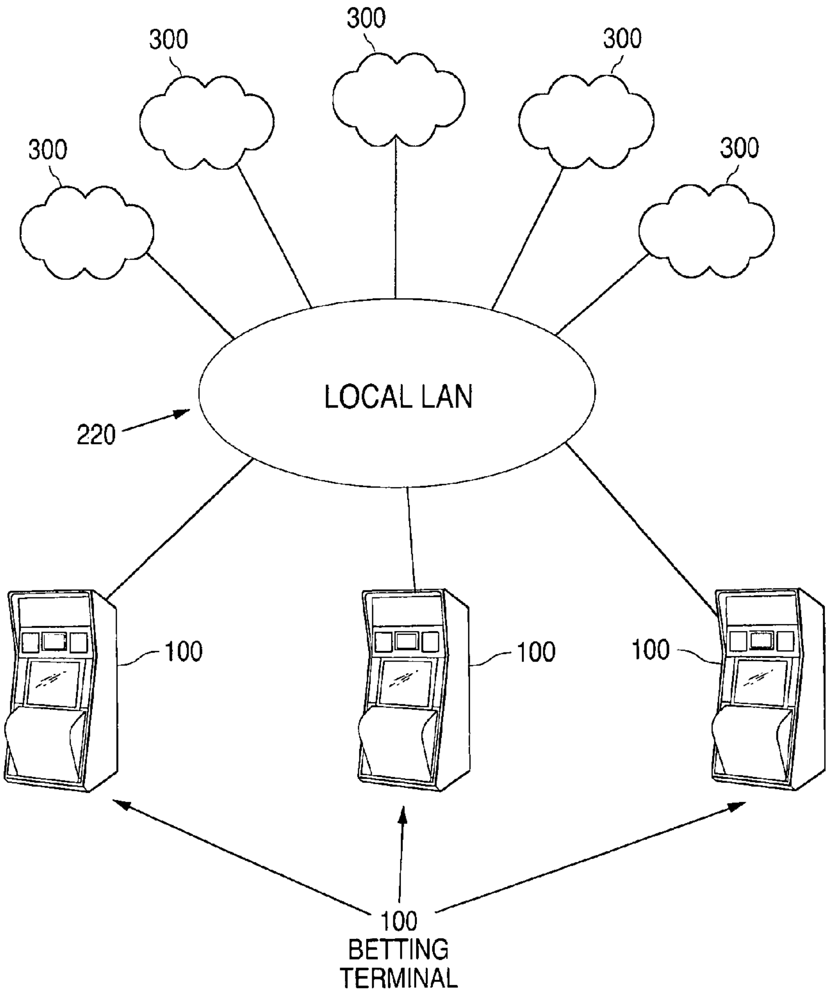
FIG. 2 shows an illustrative scheme of a betting system of the present invention.

The betting terminal can be linked to different types of games. An illustrative general scheme of the betting terminal 100 is described in FIG. 1, which includes a switching mechanism 200 allowing a player to select a game to play. The switching mechanism 200 (not shown) can further include a game indicator 210 showing the type of game selected. The switching mechanism can be located in anywhere of the betting terminal. In some embodiments, the betting terminal is linked to a plurality of game tables. An illustrative general layout of a gaming system via a betting terminal of the present invention is provided by FIG. 2. In FIG. 2, a plurality of betting terminals (100) (three betting terminal are listed as examples) are linked via a network (220) to a plurality of game tables (300). The game tables can be conventional baccarat game tables, jackpot baccarat game tables as described in the U.S. application Ser. No. 11/042,732, filed on Jan. 24, 2005, Ser. No. 11/198,218, filed on Aug. 5, 2005 and Ser. No. 11/312,150, filed on Dec. 19, 2005, and Macau Patent Application Nos. 1/150, filed on Feb. 4, 2005 and 1/265, filed on Jan. 24, 2006, the teachings of which are incorporated herein by reference. In some embodiments, the game tables can be any game tables played in a casino or internet.

In one embodiment, the betting terminal described herein is one for baccarat. For example, a baccarat gaming system that allows one to play a live baccarat jackpot as described in the U.S. application Ser. No. 11/042,732, filed on Jan. 24, 2005, Ser. No. 11/198,218, filed on Aug. 5, 2005 and Ser. No. 11/312,150, filed on Dec. 19, 2005, and Macau Patent Application Nos. 1/150, filed on Feb. 4, 2005 and 1/265, filed on Jan. 24, 2006, the teachings of which are incorporated herein by reference.

Figure 3:
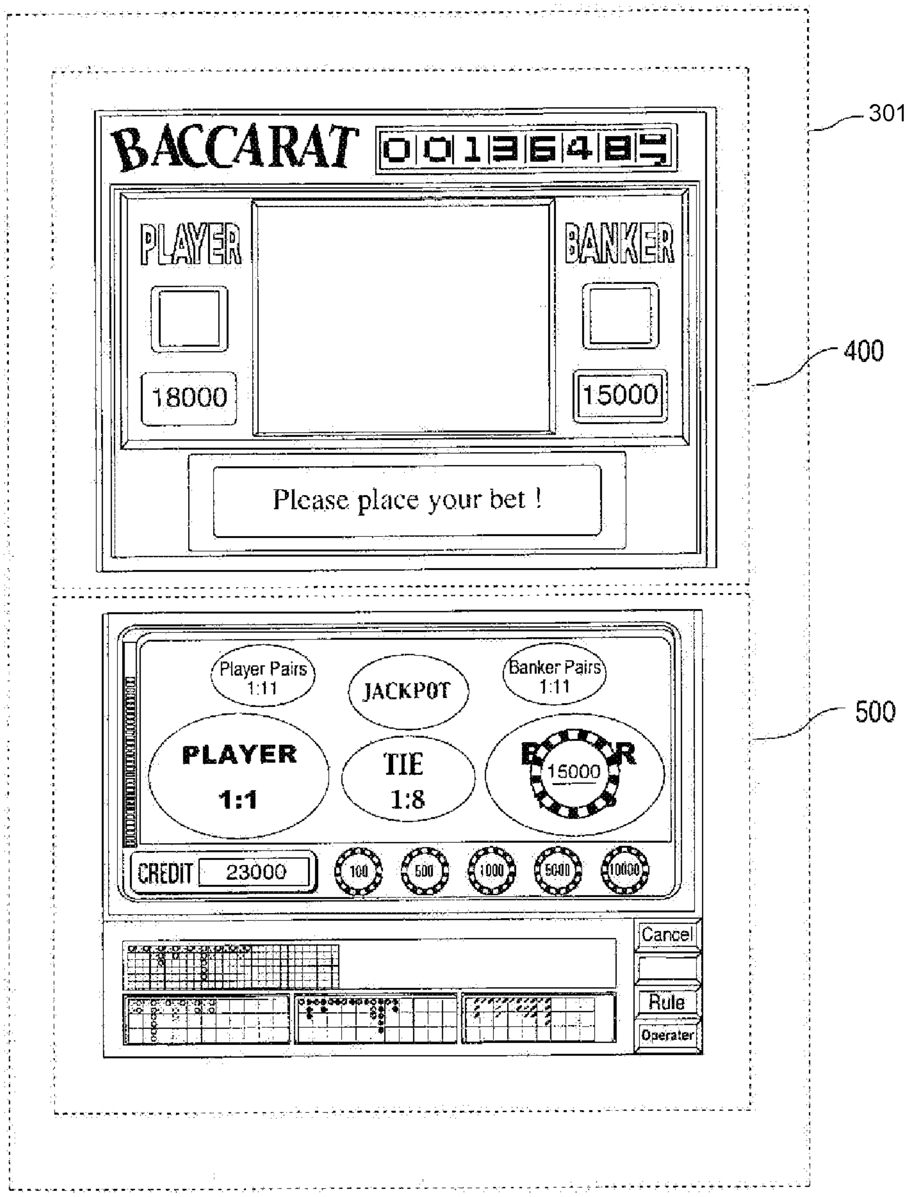
FIG. 3 shows a general layout of a betting terminal for live jackpot baccarat game.

A general layout of a betting terminal for a live jackpot baccarat game is shown in FIG. 3, FIGS. 4A and 4B. FIG. 3 shows the overall layout of the betting terminal (301), which has two screens, the upper screen (400) and the lower screen (500), shown in detail in FIGS. 4A and 4B, and a switching mechanism 200, which is not shown. Referring to FIG. 4A, upper screen 400 includes an display part (410) for displaying the rolling amount of jackpot, the center part (420) for displaying a live video of the gambling table, and a messenger screen (430) for displaying messages or game cards. The center part of the upper screen has a left section designated as Player (440), which has a small screen (450), and right section 10 designated as Banker (460), which also has a small screen (470). The small screens 450 and 470 are for display of card values of the player hand and the bank hand respectively. The current limits available for betting on Player (player hand) and Banker (bank hand) in a live baccarat game are shown in small screens 480 and 490 below small screens 450 and 470, respectively. Referring to FIG. 4B, the lower screen 500 is an operating touch screen for betting, which includes bet-option buttons (510), bet-amount buttons (520), and credit window (530). The bet-option buttons 510 include the various betting selections described above, e.g., betting for player hand (511) win with a payoff rate of 1:1, for the bank hand (512) win with a payoff rate of 1:0.95, for tie (513) with a payoff rate of 20 1:8, for Player Pairs (514) with a payoff rate of 1:11, for banker pairs (515) with a payoff rate of 1:11, and for Jackpot bet (516), the rules of which are described above. Box 517 shows the pops up when bets are placed on a particular bet option. The number inside Box 517 corresponds to the amount placed on a particular bet option. The bet-amount buttons 520 as shown in the layout, 100, 500, 1000, 5000, 10000, provide the players the convenience of adding up betting amounts in a fast manner.

To illustrate, for a bet of 10,000 USD or HKD, the player can simply press the "1000" button ten times to reach the desired betting amount. Note, the bet-amount buttons 520 shown are illustrative and non-exclusive. Buttons designated for other amounts, e.g., "1", "5", "10", "100", "100,000", "1,000,000" can be readily added to the screen. The credit window 530 shows the remaining balance of a player's credit. The player may insert bills or chips into or transfer money from a credit card account and/or a bank account to the machine to add up the credit amount from time to time. If the player desires to stop playing the baccarat game and to cash out, he may ask the operator to authorize a cash-out procedure, and then obtain the remaining balance. Still referring to FIG. 4B, the lower screen 500 further includes language selection button (540), which can switch the operation language of the baccarat game between, e.g., Chinese, English, Portuguese, Italian, French, Spanish, Russian, German, Arabic, Japanese, and Korean, etc, Rule selection button (550), which prompts the display of rules for live baccarat and Paradise Jackpot™, Cancel button (560), which allows the bettor to cancel all bets made before he presses the confirmation button on the top right hand corner of the lower screen. Operator button (570), which allows the bettor to call for assistance from the casino staff when there is machine failure or the bettor wishes to exit from the game, and Results Bars (580, 590) which display the results for previous games (e.g. live baccarat games). Once results of a game are confirmed, the losing bet shown in the bet option buttons (510) in the center of lower screen will disappear while the winning bet in the bet option buttons (510) in the lower screen will flash and a diagram will pop up with detailed breakdown of the payouts for each of the bet options won.

Figure 4C:
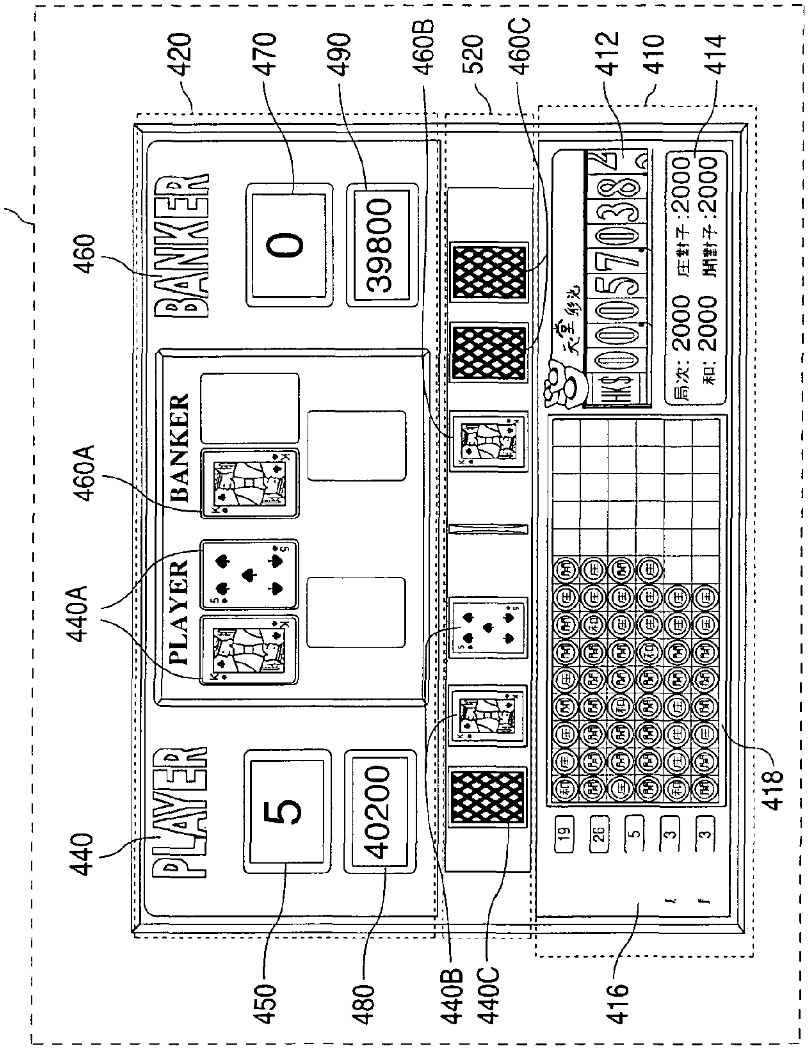
Figure 4D:
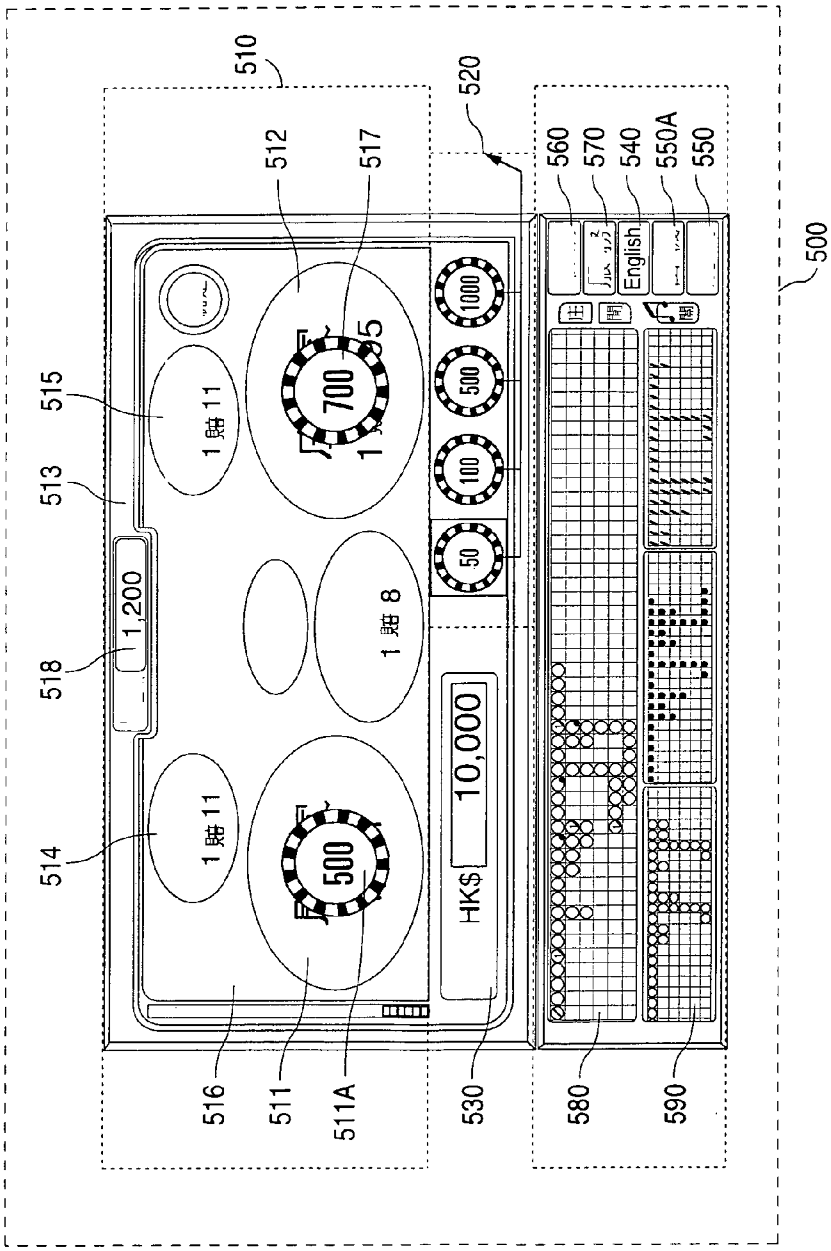

FIGS. 4C and 4D show two variants of the design of the betting terminal similar to the embodiment as described in FIGS. 4A-4B. Referring to FIG. 4C, upper screen 400 includes a display part (410) for displaying the baccarat game result and rolling amount of jackpot, a display part (420) for displaying a live video of the gambling table, and a messenger screen (430) for displaying game cards. The display 10 part 420 has a left section designated as Player (440), which has a small screen (450), and right section designated as Banker (460), which also has a small screen (470).

The small screens 450 and 470 are for display of card values of the player hand and the bank hand respectively. The current limits available for betting on Player (player hand) and Banker (bank hand) in a live baccarat game are shown in small screens 480 and 490 below small screens 450 and 470, respectively. Still referring to FIG. 4C, the display part 420 can display Player game cards 440A and Banker game cards 460A. The messenger screen 430 shows game cards directly from a shoe in a baccarat game (not shown), 440B and 440C for the Player, and 460B and 460C for the Banker. The game cards 440A and 440B correlate to each other can have the same or different appearance. Similarly, the game cards 460A and 460B correlate to each other can have the same or different appearance. Preferably, game cards 440A, 440B, 440C, 460A, 460B and 460C are shown directly from a shoe in a baccarat game (not shown).

Still referring to FIG. 4C, the display part 410 includes a screen (412) for showing jackpot amount, display 414 showing game number (e.g., game No. 52) and respective amounts available for betting on banker pairs, player pairs or tie, display 416 showing the frequency of bank hand win, player hand win and tie in past games, and display 418 showing the sequence of bank hand win, player hand and tie in past games.

Referring to FIG. 4D, the lower screen 500 is an operating touch screen for betting, which includes bet-option buttons (510), bet-amount buttons (520), and credit window (530). The bet-option buttons 510 include the various betting selections described above, e.g., betting for player hand (511) win with a payoff rate of 1:1, for the bank hand (512) win with a payoff rate of 1:0.95, for tie (513) with a payoff rate of 1:8, for Player Pairs (514) with a payoff rate of 1:11, for banker pairs (515) with a payoff rate of 1:11, and for Jackpot bet (516), the rules of which are described above. Box (511A) and Box (517) show the pops up when bets are placed on a particular bet option. The number inside Box 511A corresponds to the amount placed on a particular bet option on a player hand win. The number inside Box 517 corresponds to the amount placed on a particular bet option on banker hand win. Display screen (518) shows the total accepted amount of bets placed on all bet options. The bet-amount buttons 520 as shown in the layout, 50, 100, 500, 1000, provide the players the convenience of adding up betting amounts in a fast manner. Note, the bet-amount buttons 520 shown are illustrative and non-exclusive. Buttons designated for other amounts, e.g., "1", "5", "10", "100", "100,000", "1,000,000" can be readily added to the screen. The credit window 530 shows the remaining balance of a player's credit. The player may insert bills or chips into or transfer money from a credit card account and/or a bank account to the machine to add up the credit amount from time to time. If the player desires to stop playing the baccarat game and to cash out, he may ask the operator to authorize a cash-out procedure, and then obtain the remaining balance. Still referring to FIG. 4D, the lower screen 500 further includes language selection button (540), which currently is in Chinese and can switch the operation language of the betting table between, e.g., Chinese, English, Portuguese, Italian, French, Spanish, Russian, German, Arabic, Japanese, and Korean, etc., Rule selection button (550), which prompts the display of rules for a selected game (e.g., a live baccarat and Paradise Jackpot™), Stand-by button 550A to lock the betting terminal if the better wishes to leave the terminal for a short period of time, Cancel button (560), which allows the bettor to cancel all bets made before he presses the confirmation button on the top right hand corner of the lower screen. Operator button (570), which allows the bettor to call for assistance from the casino staff when there is machine failure or the bettor wishes to exit from the game, and Results Bars (580, 590) which display the results for previous live baccarat games. Once results of a game are confirmed, the losing bet shown in the bet option buttons (510) in the center of lower screen will disappear while the winning bet in the bet option buttons (510) in the lower screen will flash and a diagram will pop up with detailed breakdown of the payouts for each of the bet options won.

Figure 4E:
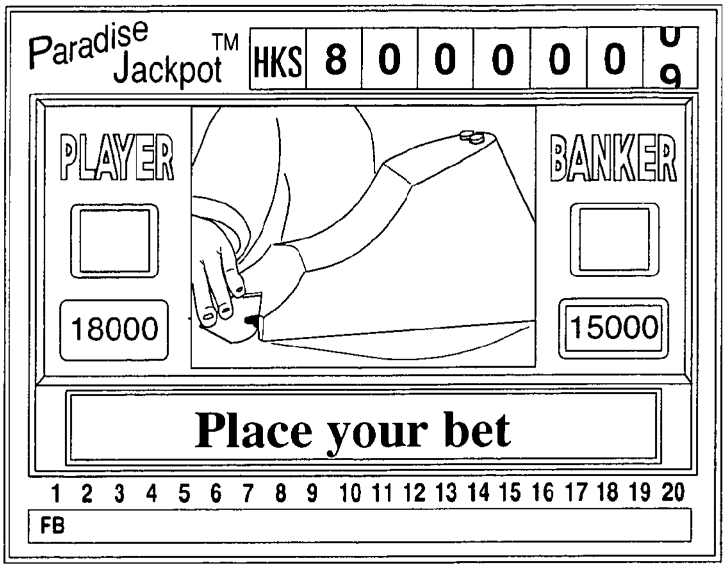
FIGS. 4E 4F, 4G and 4H show variants of the layout of the betting terminal shown in FIGS. 4A-4D.
Figure 4F:
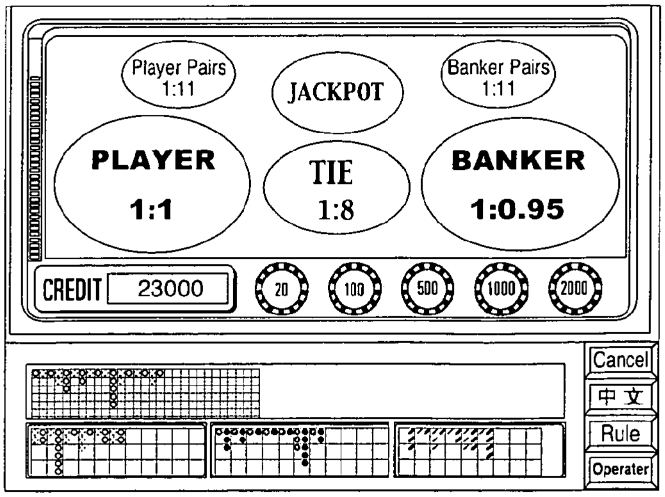
Figure 4G:
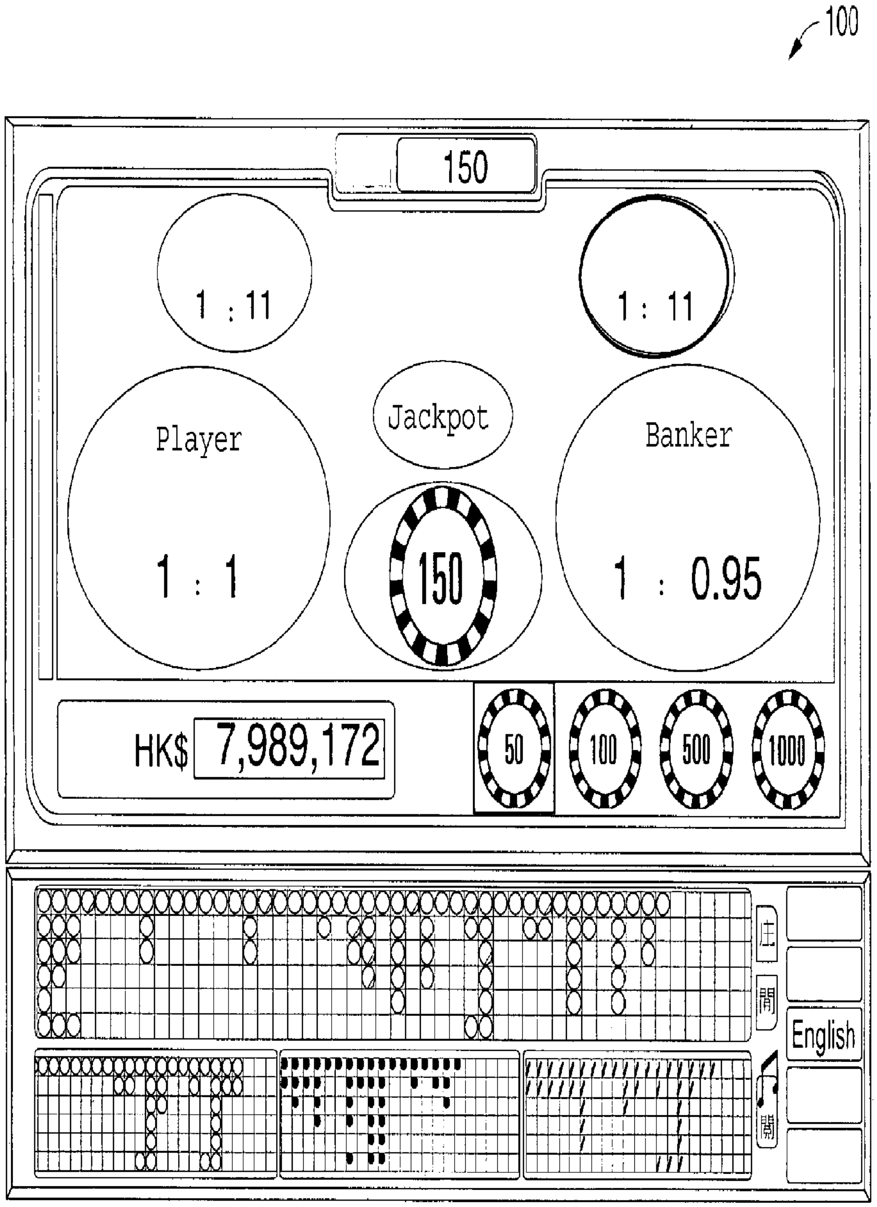
Figure 4H:
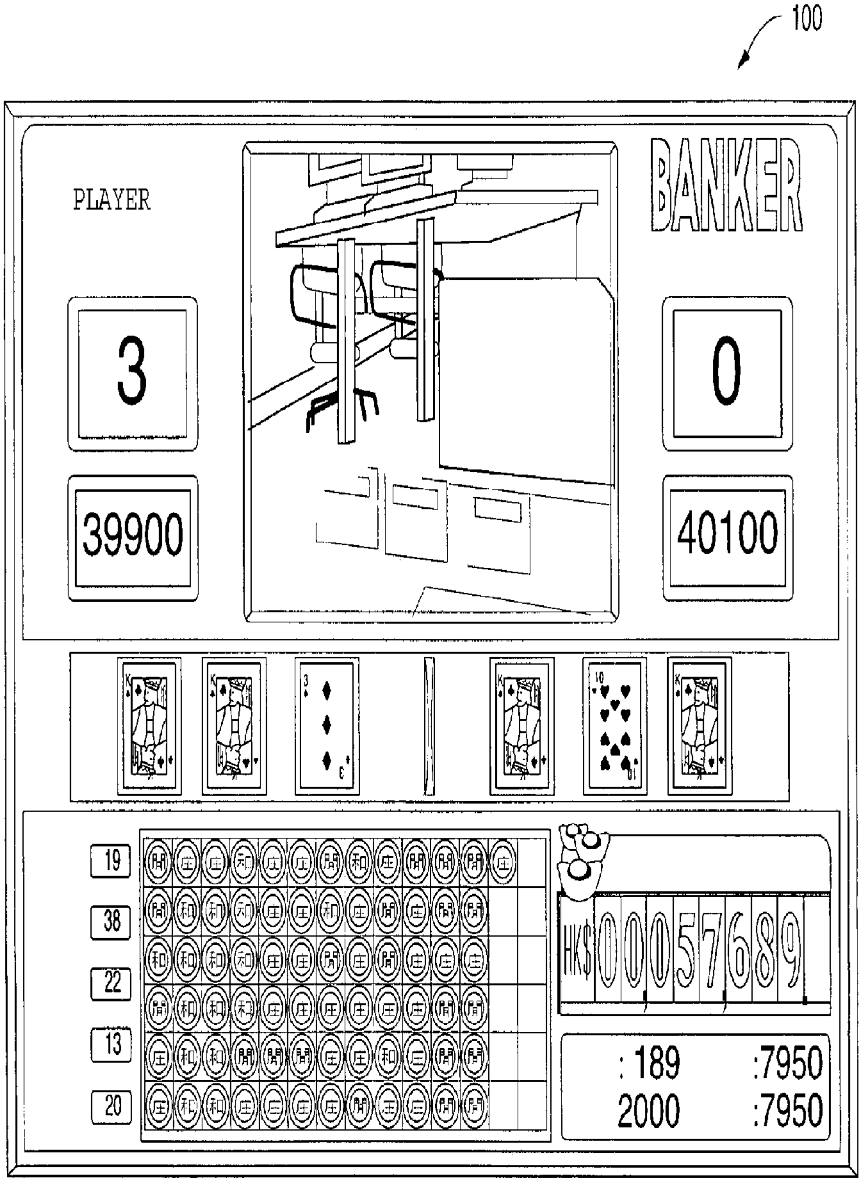

FIGS. 4F and 4H are alternative designs of the upper screen 400 as shown in FIG. 4A, which has a similar layout as the one shown in FIG. 4A except that the top left corner of the upper screen displays the words "Paradise Jackpot™" and the bottom rim has a blank bar and numbers 1 through 20 for showing the result of past games on top of the bar. FIGS. 4E and 4G are alternative designs of the lower screen of 500 as shown in FIG. 4B, which as a similar layout as the one shown in FIG. 4B except that the top rim of the lower screen 500 bears letters indicating the left side as the Player side and the right side and the Banker side, a screen at the far up-left corner indicating the maximum bet on the player hand accepted by the dealing table in a game, and a screen at the far up-right corner indicating the maximum bet on the banker hand accepted by the dealing table in a game.

Figure 5A:
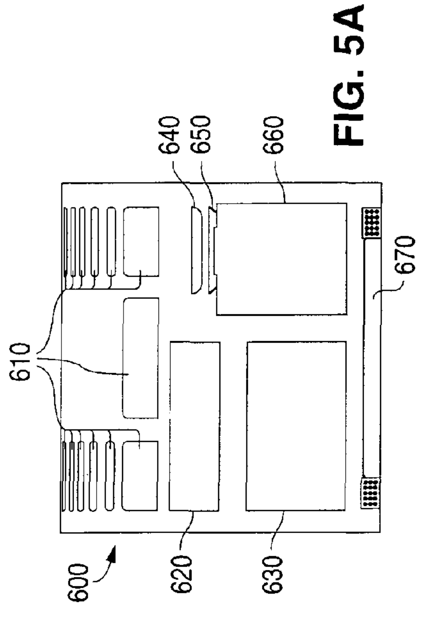
FIGS. 5A, 5B, 5C, 5D and 5E show an embodiments of the overall design of the betting terminal.
Figure 5B:
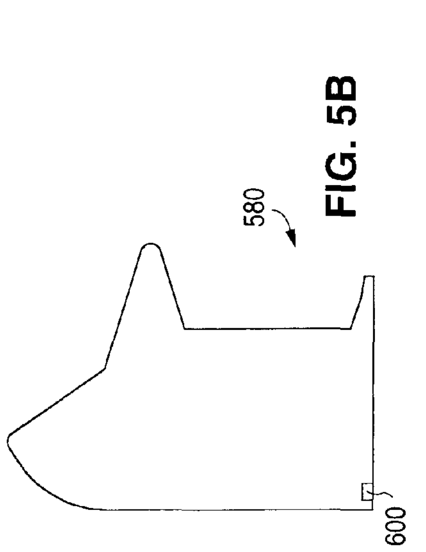
Figure 5C:
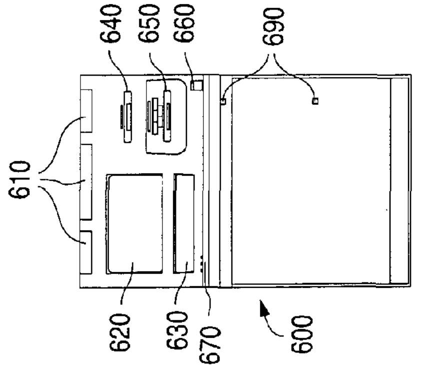
Figure 5D:
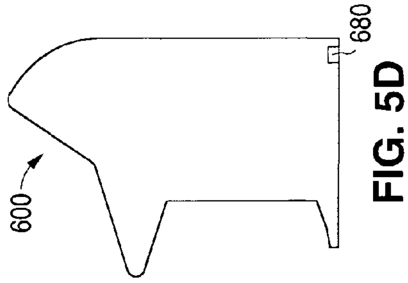
Figure 5E:
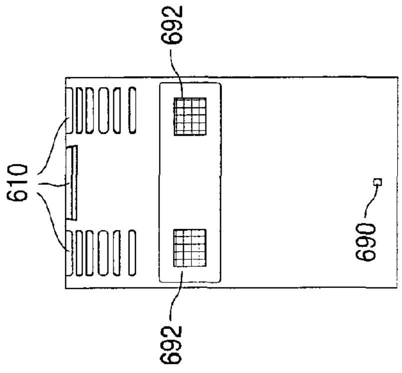

FIG. 5A shows an embodiment of the top layout betting terminal of the present invention. The top layout includes information Lamp 610, which can be color-changeable LED and flashes when a player wins a betting option, an upper screen 620, bottom screen 630, a ticket printer slot 640, a bill slot 650, table 660 for holding beverage drinks or ashtray, and speaker 670. In some embodiments, the ticket printer can print out ticket with bar code. In some embodiments, a player can also insert ticket with bar code to increase the credit amount that a play may have in a betting game. FIGS. 5B and 5D show two side views of the betting terminal, showing a cable path. FIG. 5C shows a front view of the betting terminal, showing the top layout described in FIG. 5A and speaker 670. FIG. 5E shows a back view of the betting terminal of this embodiment, showing Lamp 610, lock mechanism 690 and fan 692. In an embodiment, three betting terminals can be clustered in a unit. In some embodiments, the betting system can automatically generate commonly accepted format of past results of played games on the screen to provide references for players.

The betting terminal described above can be embodied in any form. In some embodiments, the betting terminal can be a device. In some embodiments, the betting terminal can be a virtual terminal. One of ordinary skill in the art can readily construct the betting terminal described herein.

The betting terminal described above can be used in any gaming system. In some embodiments, a betting terminal can serve as a platform for placing bets in games like baccarat, roulette, sicbo ("dice game") as well as other common casino table games which are operated at tables linked to game and payout servers and betting terminals through an intranet. In some embodiments, the roulette and sicbo table games can be operated automatically or by human dealers, but the betting results shall be sent to game and payout servers electronically to allow automatic payout process.

In some embodiments, the gaming system can further include a device on each dealing table to record the betting results automatically or manually and send the results to server for computation of payouts. In some embodiments, such a device can be, for examples, electronic scanning or reading devices known in the art, card dealing shoe with scanning device to read the cards, electronic detecting device to identify ball location on a roulette and image recognition device for reading results of a dice game.

In some embodiments, the gaming system is a baccarat gaming system. The gaming system can include a dealing table comprising a touch screen. The dealing table allows a dealer to perform a dealing process. The touch screen can prompt the dealer of the dealing process. In some embodiments, the touch screen can provide dealing instructions. The games that can be played via the betting terminal described herein in game tables or terminals located within a single gaming establishment or throughout multiple gaming establishments. The game tables or terminals can be linked together by wire or wireless linking or connecting mechanisms. In some embodiments such linking mechanisms can be electric and/or optical cable. In some embodiments, the linking mechanism can be internet or intranet.

In some embodiments, the present invention also provides a software program or a set of software programs for carrying out any or all steps of the betting method described herein. The baccarat game can also be incorporated into an electronic device or an entertainment gaming machine. Representative electronic devices include, but are not limited to, laptop computers or desktop computers. In some embodiments, such electronic devices can be a cell phone, a blackberry device or a hand held device such as hand held personal computer (PC) or personal data assistants (PDAs). The betting table and system described above can be readily constructed by an artisan of ordinary skill.

A casino system for playing a live casino table game, comprising: a plurality of game tables, each game table allowing a dealer dealing cards according to conventional gaming rules; a plurality of electronic handheld devices remotely located from the game tables, each electronic handheld device is configured to display a video of at least one game taking place at the plurality of game tables; a gaming server; and a network operatively coupling the gaming server to the game tables and the electronic handheld devices; wherein each electronic handheld device includes a display part comprising: a video display area, the video display area configured to display a video of at least one game taking place at the plurality of game tables; and a player wagering display area having a touch screen input configured to display a plurality of touch screen results bars, each said touch screen results bar displaying the results for at least two previously played games at the plurality of game tables, and allow a player at each one of the electronic handheld devices to switch between the plurality of the game table's videos in response to touching said touch screen results bar. In this way, a player can be sitting across the casino and monitoring the live table games. The table games can be any type of table games. Still further, the player can select which table they want to see the video of according to the results bar (e.g. 580, 590). For example, there may be a top results bar 580 that shows the past results of the last thirty to eighty games (this is by way of example only and not to be taken in a limiting sense). The top results bar 580 shows the past results for the table which corresponds to the video being shown on the electronic handheld device. There may be a larger number of past results (i.e. a larger results bar 590) for the table which corresponds to the video currently being shown on the electronic handheld device. The results bars below (590) may be abbreviated results bars which show, for example the last twenty games played at that table. In the example shown in FIG. 4D there are three other games results bars (590). The smaller results bars 590 each correspond to tables for which the video is not currently being shown on the electronic handheld device. The player may touch anyone of the results bars (e.g. the three results bars 580 shown in FIG. 4D) to select the video that corresponds to that table. Upon touching a results bar it becomes a selected results bar and the remaining touch screen results bars become unselected touch screen results bars. When the player selects that results bar (by touching it) it may become the larger results bar (590) showing a greater number of results and the video shows the table selected. If the player has selected a different results bar than the one currently selected (and for which the video is currently being shown) that selected results bar and the corresponding table becomes the video being displayed and the table which was being displayed drops down to the smaller results bars for which video is not currently being displayed and is not currently selected.

According to one embodiment, the live casino table game being played is a baccarat game. Each of the electronic handheld devices may be further configured to provide a screen showing game number (see, for example FIG. 4C, display 416 showing game number) and respective amounts bet on the banker pair, the player pair or the tie, the results bar showing a frequency of bank hand wins, player hand wins and ties in past games, and a sequence of the bank hand wins, the player hand wins and the ties in past games.

There may be any number of results bars shown, each of which correspond to a single gaming table. In this way, a player may be sitting at a slot machine (by way of example) and monitoring multiple table games without getting up from their seat. They may wait until the game shows historical data that they like (on the results bar) to decide to get up and play at the table. This increases revenue to the gaming establishment as players can be gambling and monitoring the tables. Also, certain players who may be intimidated can watch the table play and learn the process. This can add to the excitement of the player, as they can monitor multiple tables and easily switch between tables. Finally, it gives the player a feeling of an advantage being easily able to compare the multiple tables and select the table they feel has the greatest chances of delivering a win.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

I claim:

1. A gaming system comprising:

a gaming server configured to operate, via a network, with a plurality of game tables, and with an electronic handheld device remotely located from the plurality of game tables to:

cause a display, by the electronic handheld device, of a video display area including at least one of a plurality of videos of at least one of a plurality of games taking place at at least one of the plurality of game tables, and a player wagering display area including a plurality of results bars, wherein each results bar displays results for at least two previously played games that occurred at at least one of the plurality of game tables, and the plurality of results bars are displayed simultaneously with the display of the at least one video; and separate from a bet being placed by a player on a first one of the plurality of the games taking place at a first one of the plurality of game tables and responsive to the player of the electronic handheld device making a first input to a first area of a touch screen of the electronic handheld device that corresponds to a first area of the video display area which displays one of the plurality of results bars, cause the video display area of the electronic handheld device to switch from displaying the video of the first one of the plurality of the games taking place at the first one of the plurality of game tables to display the video of a second one of the plurality of games taking place at a second one of the plurality of game tables.

2. The gaming system of claim 1, wherein the player wagering display area further includes a plurality of displayed bet option buttons, wherein a bet is placed at a selected game table responsive to the player of the electronic handheld device making a second input to a second area of the touch screen of the electronic handheld device which corresponds to a second area of the video display area which displays one of the bet option buttons.

3. The gaming system of claim 1, wherein the plurality of results bars include one larger results bar associated with a greater number of past game results than another smaller results bar.

4. The gaming system of claim 1, wherein the electronic handheld device is selected from the group consisting of: a laptop computer, a cell phone, a smart phone, a hand held personal computer or a hand held personal data assistant.

5. The gaming system of claim 1, wherein the game is a baccarat game and the results bar displays a frequency of bank hand wins, player hand wins and ties in past games, and a sequence of the bank hand wins, the player hand wins and the ties in past games.

6. The gaming system of claim 1, wherein a selected results bar displays a greater number of past game results responsive to the player making an input in association with that results bar.

7. A gaming system comprising:

a gaming server configured to operate, via a network, with a plurality of game tables and with an electronic handheld device remotely located from the plurality of game tables to:

cause a display, by the electronic handheld device, of a video display area including at least one of a plurality of videos of at least one of a plurality of plays of a Baccarat game taking place at at least one of the plurality of game tables and a player wagering display area including a plurality of results bars, wherein each results bar displays results for at least two previously played Baccarat games that occurred at at least one of the plurality of game tables including a frequency of bank hand wins, player hand wins and ties in past games, and a sequence of the bank hand wins, the player hand wins and the ties in past games, and the plurality of results bars are displayed simultaneously with the display of the at least one video, and separate from a bet being placed by a player on a first one of the plurality of the Baccarat games taking place at a first one of the plurality of game tables and responsive to the player of the electronic handheld device making a first input to a first area of a touch screen of the electronic handheld device that corresponds to a first area of the video display area which displays one of the plurality of results bars:

cause the video display area of the electronic handheld device to switch from displaying the video of the first one of the plurality of the Baccarat games taking place at the first one of the plurality of game tables to display the video of a second one of the plurality of Baccarat games taking place at a second one of the plurality of tables, and cause the video display area of the electronic hand held device to display a game number and amounts bet on a banker pair of the second one of the plurality of Baccarat games, a player pair of the second one of the plurality of Baccarat games or a tie.

8. The gaming system of claim 7, wherein the player wagering display area further includes a plurality of displayed bet option buttons, wherein a bet is placed at a selected game table responsive to the player of the electronic handheld device making a second input to a second area of the touch screen of the electronic handheld device that corresponds to a second area of the video display area which displays one of the bet option buttons.

9. The gaming system of claim 7, wherein a selected results bar is a larger results bar associated with a greater number of past game results than another unselected results bar.

10. The gaming system of claim 7, wherein a selected results bar displays a greater number of past game results upon said player making an input in association with that results bar.

11. The gaming system of claim 7, wherein the electronic handheld device is selected from the group consisting of: a laptop computer, a cell phone, a smart phone, a hand held personal computer or a hand held personal data assistant.

12. A gaming terminal comprising:

a display device;

a touch screen associated with the display device;

a processor; and a memory device which stores a plurality of instructions, which when executed by the processor, cause the processor to:

cause the display device to display a video display area including:

a video of a first one of a plurality of games taking place at a first one of a plurality of game tables located remote from said gaming terminal, and a player wagering display area including a plurality of results bars, wherein each results bar displays results for at least two previously played games that occurred at at least one of the plurality of game tables, and the plurality of results bars are displayed simultaneously with the display of the video, enable a player to place a bet on the first one of the plurality of games taking place at the first one of the plurality of game tables, and separate from the bet being placed on the first one of the plurality of the games taking place at the first one of the plurality of game tables and responsive to the player making a first input to a first area of the touch screen that corresponds to a first area of the video display area which displays one of the plurality of results bars, cause the display device to switch to displaying a video of a second one of the plurality of games taking place at a second one of the plurality of game tables.

* * * * *